US011772065B2

(12) United States Patent
Hirschberg

(10) Patent No.: US 11,772,065 B2
(45) Date of Patent: Oct. 3, 2023

(54) CONTACTOR

(71) Applicant: Hirschberg Engineering AG, Winterthur (CH)

(72) Inventor: Sebastian Hirschberg, Winterthur (CH)

(73) Assignee: Hirschberg Engineering AG, Winterthur (CH)

( * ) Notice: Subject to any disclaimer, the term of this patent is extended or adjusted under 35 U.S.C. 154(b) by 0 days.

(21) Appl. No.: 17/832,070

(22) Filed: Jun. 3, 2022

(65) Prior Publication Data

US 2022/0297081 A1    Sep. 22, 2022

Related U.S. Application Data

(63) Continuation of application No. 16/087,254, filed as application No. PCT/EP2017/056422 on Mar. 17, 2017, now Pat. No. 11,369,939.

(30) Foreign Application Priority Data

Mar. 31, 2016    (EP) ..................................... 16163271

(51) Int. Cl.
 *B01J 19/32* (2006.01)
 *B01D 3/28* (2006.01)
 *B01D 3/00* (2006.01)

(52) U.S. Cl.
 CPC ................ *B01J 19/32* (2013.01); *B01D 3/00* (2013.01); *B01D 3/28* (2013.01);
 (Continued)

(58) Field of Classification Search
 CPC .... B01D 3/00; B01D 3/28; B01J 19/32; B01J 2219/32206; B01J 2219/32227; B01J 2219/32286; B01J 2219/32296; B01J 2219/32408; B01J 2219/32425; B01J 2219/32441; B01J 2219/32466; B01J 2219/32483; B01J 2219/32491; B01J 2219/3322; B01J 2219/3325
 See application file for complete search history.

(56) References Cited

U.S. PATENT DOCUMENTS 2,681,269 A    6/1954 Bergstrom
3,039,752 A    6/1962 Kittel
(Continued)

FOREIGN PATENT DOCUMENTS

CN    101603753 A    12/2009
CN    102083770 A    6/2011
(Continued)

OTHER PUBLICATIONS

Piani, L. et al. "Sodium Tripolyphosphate and Polyphosphate as Dispersing Agents for Alumina Suspensions: Rheological Characterization" Journal of Engineering, 2013, pp. 1-4, vol. 2013, Article ID 930832.

*Primary Examiner* — Charles S Bushey
(74) *Attorney, Agent, or Firm* — Larson & Anderson, LLC

(57) ABSTRACT

A device is provided having a structure for conducting a first fluid, the structure having in addition an interface for conducting a second fluid. The first fluid can be brought into contact with the second fluid at the interface of the structure. A flow interrupter (120.0) for interrupting a flow of the second fluid is situated at the interface of the structure.

13 Claims, 9 Drawing Sheets

Figure 1:
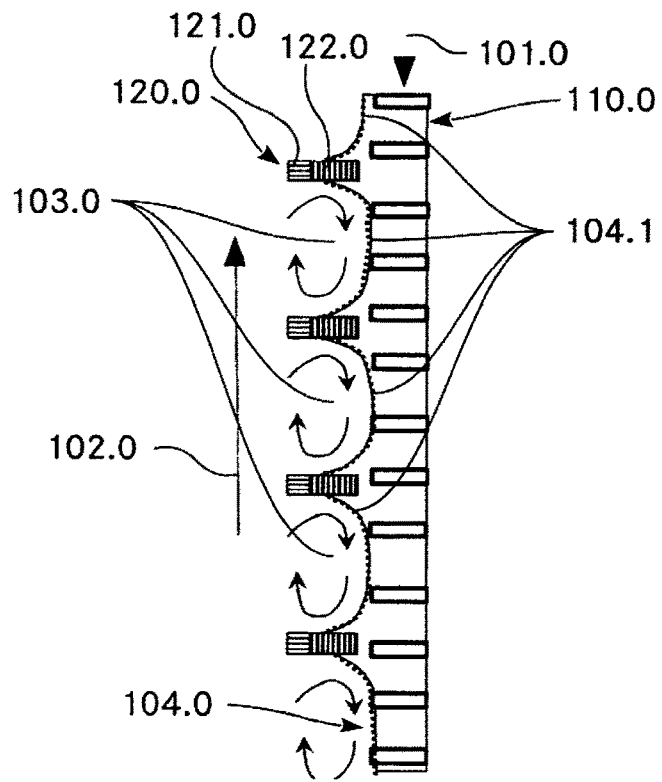

(52) U.S. Cl.
CPC .......... *B01J 2219/32206* (2013.01); *B01J 2219/32227* (2013.01); *B01J 2219/32286* (2013.01); *B01J 2219/32296* (2013.01); *B01J 2219/32408* (2013.01); *B01J 2219/32425* (2013.01); *B01J 2219/32441* (2013.01); *B01J 2219/32466* (2013.01); *B01J 2219/32483* (2013.01); *B01J 2219/32491* (2013.01); *B01J 2219/3322* (2013.01); *B01J 2219/3325* (2013.01)

(56) References Cited

U.S. PATENT DOCUMENTS

| | | |
|---|---|---|
| 3,385,575 A | 5/1968 | Hall |
| 3,466,019 A | 9/1969 | Priestley |
| 3,612,494 A | 10/1971 | Toyama |
| 3,722,185 A | 3/1973 | Miczek |
| 3,743,256 A | 7/1973 | Oplatka |
| 4,133,709 A | 1/1979 | Carrico |
| 4,701,287 A | 10/1987 | Manteufel |
| 4,769,186 A | 9/1988 | Raybon |
| 5,624,733 A | 4/1997 | McKeigue |
| 6,565,629 B1 | 5/2003 | Hayashida et al. |
| 7,195,059 B2 | 3/2007 | Lomax, Jr. |
| 7,976,783 B2 | 7/2011 | Feinstein |
| 10,533,807 B2* | 1/2020 | Hirschberg ............ F28F 13/12 |
| 11,369,939 B2* | 6/2022 | Hirschberg ............ B01J 19/32 |
| 2001/0051119 A1 | 12/2001 | Overbeek et al. |
| 2002/0026998 A1 | 3/2002 | Paulman |
| 2006/0016216 A1 | 1/2006 | Tonkovich et al. |
| 2009/0285956 A1 | 11/2009 | Landers et al. |
| 2010/0220985 A1 | 9/2010 | Eisenhauer et al. |
| 2011/0105304 A1 | 5/2011 | Del-Gallo et al. |
| 2015/0246484 A1 | 9/2015 | Hirschberg |
| 2017/0014797 A1 | 1/2017 | Iso et al. |
| 2017/0348912 A1 | 12/2017 | Hirschberg |

FOREIGN PATENT DOCUMENTS

| | | |
|---|---|---|
| CN | 103256717 A | 8/2013 |
| EP | 2897783 A1 | 7/2015 |
| JP | 2002-516745 A | 6/2002 |
| JP | 2012-130918 A | 7/2012 |
| JP | 2014109391 A | 6/2014 |
| WO | 2013/120551 A1 | 8/2013 |
| WO | 2014/043823 A1 | 3/2014 |
| WO | 2016/095059 A1 | 6/2016 |

* cited by examiner

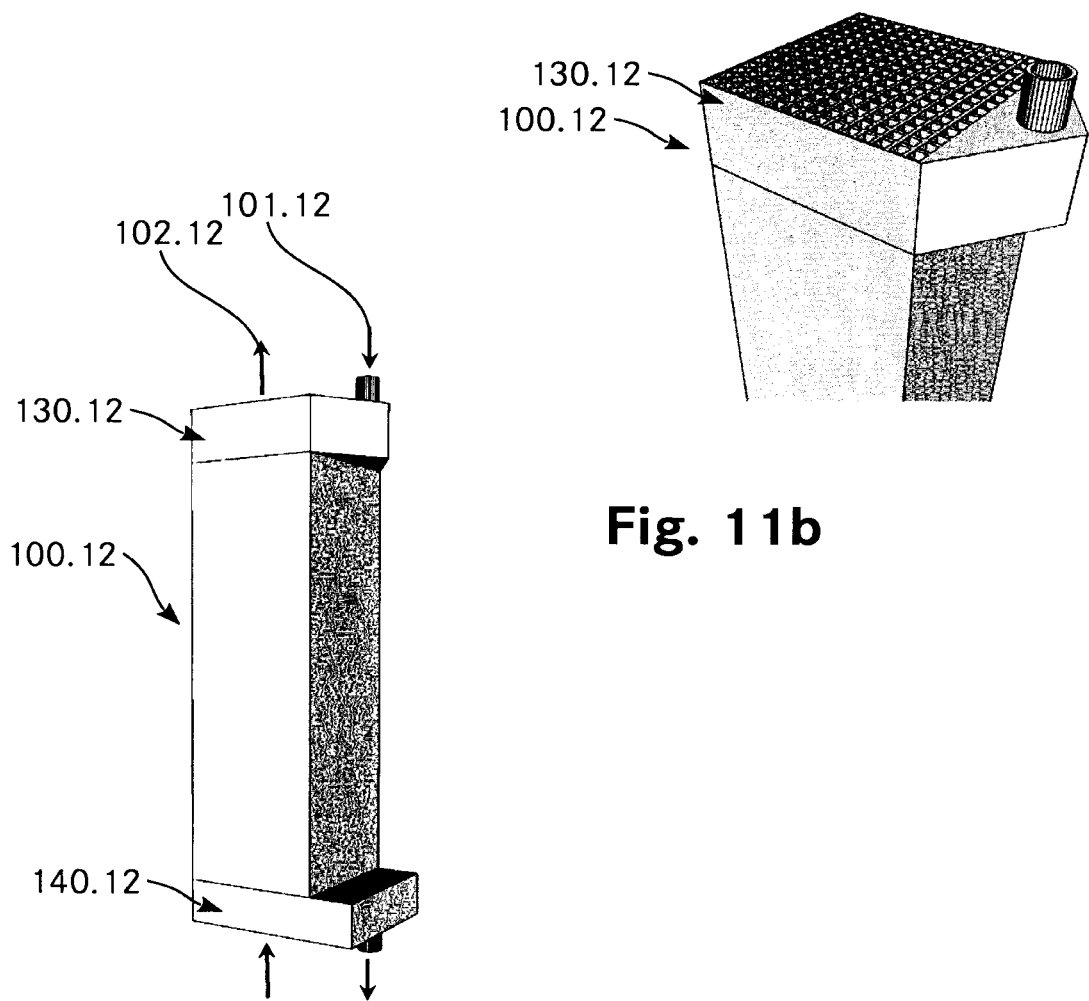
Fig. 11b
Fig. 11a
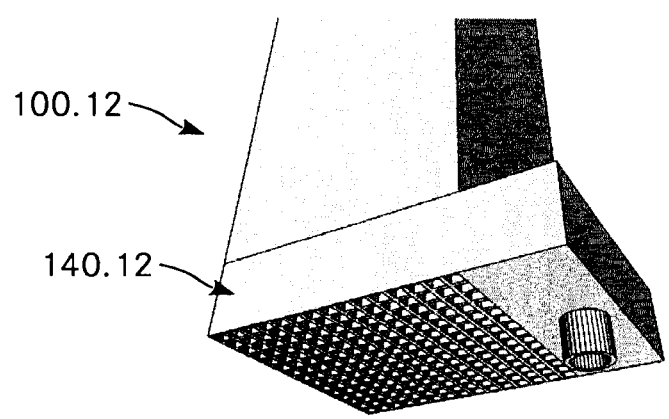
Fig. 11c

CONTACTOR

TECHNICAL FIELD

The invention relates to a device, in particular a contactor for bringing into contact at least two fluid flows, comprising a structure for conducting a first fluid, whereby the structure has in addition an interface, which interface is arranged to conduct a second fluid whereby in the contact zone the first fluid can be brought into contact with the second fluid. The invention also relates to an arrangement comprising at least a device as well as a method for producing a contact between a first and a second fluid.

PRIOR ART

In process engineering, different fluid flows are brought into contact with one another in different procedural steps. An exchange of material and energy between the fluid flows or chemical reactions are enabled through the targeted contacting of the flows. The fluid flows may consist of two immiscible fluids or a gaseous fluid and a liquid. For generating the contact, different techniques are applied. On the one hand, one fluid flow may be dispersed or atomized in the respective other flow in order to produce a large surface between the fluids. Typically, the two fluids are separated again in a later step. In addition, the two fluids can be passed through a receptacle concurrently, in the inside of which large surfaces for contacting the fluid flows are provided. Examples for such devices are tower-packing columns or columns with structured packing. Particularly efficient are methods in which the fluid flows to be brought into contact are passed concurrently. Examples for the respective devices are plate columns, tower-packing columns, columns with structured packing, falling film evaporators, thin-film evaporators and more. For some processes, cross-current contactors can be used as well. In cross-current contactors, the two fluid flows do not run in the same direction, as is the case with concurrent, nor in opposite directions, as is the case with counter-current, but rather cross each other and exchange materials while crossing. Examples are cross-current film evaporators or gas scrubbers, in which a fluid flows downwardly on the surface of packings or structured internals due to gravity as a film, while a vapor or gas flow passes the structures in a direction deviating from the flow direction of the fluid and is brought into contact with said film.

For a large-scale implementation of this principle, it proved reasonable for cost reasons to carry out the counter- or cross-current contacting merely with the help of gravitation. However, this involves a limitation of the achievable throughput, as the contacting fluids drag each other away. In case of the counter-current contacting, as of a specific throughput the forces between the fluid flows therefore get greater than gravitation, which is supposed to bring the heavier of the two phases in the device down. As soon as the forces between the phases get greater than gravitation, flooding occurs. The heavier phase can no longer flow downward through the device as of the flooding point, but is rather dragged upwardly by the lighter phase. In case of cross-current, the fluid film is dragged away by the fluid flow crossing it. In cross-current contacting, the process cannot be controlled properly because of the dragging away of the fluid, and the collection of the superfluous liquid phase in the film, or, respectively, the separation of the two flows is made more difficult.

One type of such fluid-fluid contacting processes is distillation. In this case, a material exchange is typically generated between a fluid and a gas flow concurrently. In distillation in structured packaging, it turned out that typically, there is a natural limit in case of a drop in pressure of the gas fluid of approximately 10-12 mbar/m. Process points with a larger drop in pressure in the upturned gas flow are therefore often impossible, as usually the column would be flooded.

The currently known contactors have the disadvantage that due to their tendency to flood they allow only a limited mass transfer.

PRESENTATION OF THE INVENTION

The objective of the invention is to provide a device that is associated with the initially described technical field, with which two fluids are brought into contact, whereby a risk of flooding or the risk of having one fluid dragged away are reduced. This in particular in such a manner that an intensive material exchange between the fluids to be processed can be achieved in case of very high flow rates of the two fluids, and that the device for the material exchange can be built more compactly.

The solution for the objective is defined by the features of embodiments described herein. According to the invention, at least one flow breaker is arranged in the contact zone for interrupting a flow of the second fluid.

The device is used with that in order to produce a contact between a first fluid and a second fluid in a process.

Preferably, the flow velocity of the second fluid is selected such that no flooding occurs. The formation of the flow breaker in the contact zone of the structure among other things has the effect, among other things, that the flooding phenomenon in case of counter-current, or, respectively, the dragging away of the fluid in the film in case of cross-current can be prevented. In particular, in both cases the first fluid is conducted in the structure for conducting the first fluid, especially in pores and/or capillaries of the structure, so that it wets the structure for conducting the first fluid. The second fluid flows along the contact zone, in particular through the areas of the device that are located outside the structure for conducting the first fluid and do particularly not comprise any pores and/or capillaries of the structure, so that it does hardly wet the structure for conducting the first fluid or does not wet it at all. With that, a particularly efficient device for contacting a first fluid with a second fluid in a manner without dispersing the first fluid in the second fluid or vice versa. In this manner, a particularly intensive contact between the first fluid and the second fluid at the interface is achieved.

In variants, the flow velocity can be selected so that a risk of flooding is only reduced.

The structure can principally be chosen arbitrarily. The only requirement regarding the structure is that a fluid can be conducted from a first end of the structure to a second end of the structure. The first fluid need not be conducted straight, but can also be conducted along a random path through the structure.

The contact zone is in particular an area of a surface, an enveloping surface and/or a boundary surface of the structure for conducting the first fluid. The contact zone is essentially defined by the geometry of the structure for conducting the first fluid, in particular by the geometry of the outer boundary and/or an enveloping surface of the structure for conducting the first fluid. The contact zone is situated in particular outside the structure for conducting the first fluid and does particularly not comprise any pores and/or capillaries. The contact zone is designed in such a way that the first fluid flowing inside the structure for conducting the first fluid can get into contact with the second fluid in the contact zone, which second fluid flows outside the structure for conducting the first fluid.

When using the device according to the invention, an interface forms in the contact zone between the first fluid and the second fluid. In other words, this is a phase separation surface between the two fluids. The interface is thus not automatically understood as geometrically distinct surface at the structure for conducting the first fluid. The interface is in particular not necessarily identical with the surface, the enveloping surface and/or the boundary surface of the structure for conducting the first fluid. Depending on the fluids used, the interface between the fluids may vary and be located, for instance, above the surface, the enveloping surface and/or the boundary surface of the structure for conducting the first fluid. The form and position of the interface particularly depends on the fluids used, the flow condition and/or the pressure distributions in the flows of the two fluids. Due to wave phenomena and/or if in one area of the structure more fluid flows in than out over a specific time period, the form and position of the interface may also change dynamically over time. The interface is specifically a curved and/or bulbous surface, which is particularly interrupted and/or limited by the at least one flow breaker.

Principally, the first fluid and/or the second fluid may be present as any flowing substance, especially as liquid, vapor, aerosol, foam, etc. This is subject to the precondition that the two fluids cannot be homogenously mixed with each other. A "homogenous mixture" in the present context defines a mixture of two fluids that are mixed on a molecular level and are in a phase, i.e. they are optically not recognizable as mixture.

The first fluid is preferably a liquid, in particular when using the device in an extraction. Especially with respect to distillation or gas scrubbing the first fluid may also be a gas.

The second fluid is preferably present as a gas. In some variants, it might as well be a liquid. However, the first and the second fluids are not simultaneously present as a gas.

The flow breaker is preferably an element that can impact the flow of the second fluid. The term "interrupting a flow" is generally understood as changing the flow behavior. Such change may include the deceleration of the flow velocity, redirecting the fluid flow or the like.

References including the term "and/or" principally have to be interpreted in such a manner that a non-null subset of the listed features can be selected.

It is particularly preferred to systematically change the flow direction of the second fluid through the at least one flow breaker in the process, particularly to locally reverse it. With that, at least one local vortex in the second fluid is produced that is defined locally. With that, a concurrent contacting can be achieved between the first fluid and the second fluid, in particular locally.

In some variants, the device can also be operated in such a manner that eddying does not occur. Instead, the device can be operated as such, for instance, that there is only a deceleration of the second fluid.

The structure, the contact zone and/or the boundary surface are preferably arranged in such a manner that a good blending is achieved in the respective fluids. With that it can be achieved that in the contact areas fresh fluid is always available.

The flow breaker preferably comprises at least two ledges, whereby the second fluid can in particular flow in a second direction, which crosses the direction of the ledges. The term ledge is essentially understood as a prismatic element. Preferably, it is a rectangular block shape, especially an elongated block shape. In a preferred embodiment, the ledges can be formed integrally with the structure, but the device can also consist of ledges and structures in some variants. In addition, the ledge can be formed prismatically with a non-rectangular cross section.

In some variants, the flow breaker can also be formed differently. The flow breaker may, for instance, be wave line shaped, zig-zag shaped, meandering or in any other similar shape. The skilled person knows about further possible arrangements of a flow breaker.

The flooding phenomenon in cross-current, or the dragging away in the cross-current, respectively, is thus preferably prevented by a ledge system that is arranged along the boundary surface between the two flow directions of the first fluid and the second fluid. The ledges are preferably approximately perpendicular relative to the moving direction of the second fluid, which does preferably not substantially wet the structure. In practice, it proved that in a particularly preferred embodiment the ledges form an angle in the range of 70° to 90° with the flow direction of the second fluid. In special embodiments, the angle may even be smaller than 70°.

The ratio of the distance between two neighboring ledges and the height of the ledges is preferably in a range of 1 to 10, particularly preferred in a range of 3 to 7. This means that the distance between two neighboring ledges is preferably 1 to 10 times larger, particularly preferred 3 to 7 times larger than the height of the ledges as such. In tests it was able to prove that in case of insufficient distances between two neighboring ledges typically the contact between the first fluid and the second fluid cannot be sufficiently ensured. On the other hand, in case of too great distances, the effect of the ledges as flow breakers may be too insignificant, which would rather cause flooding again. The aforementioned range of a factor between 1 and 10 and particularly preferred between 3 and 7 also depends on the used fluids as well as the size of the device as such, the flow directions, the volume flows, etc. The skilled person thus understands that the factor might as well be more than 10 or less than 1.

The flow between the ledges can be specifically adjusted by using a suitable height of the ledges as well as a suitable distance between the neighboring ledges. Surprisingly, it turned out in numerous experiments that by choosing the suitable dimensions, in particular the ratio between height of and distances between the ledges the material exchange between the first fluid and the second fluid can be increased, although the velocity between the phases at the boundary surface is typically reduced.

With this principle, structures can be produced, inside of which the two fluid flows of the first fluid and of the second fluid form very large specific phase separation surfaces in the contact zone and that can still be perfused at very high velocities. In particular in case of counter-current applications the velocities of the two fluids to be brought into contact can be essentially increased and thus significantly more compact devices could be constructed. In distillation columns, for instance, the maximum capacity of a structure could be increased by a factor 5 or higher, with a contemporaneous excellent exchange between the phases. Although in such an operation the pressure loss can become significant, much higher than the 10-12 mbar/m that are the limit in prior art, no flooding occurs. Due to the suitable dimensioning of the structure, the throughput of the first fluid can be adjusted to a large extent. With that, as compared to prior art a leap in the performance of material exchange systems, such as distillation columns, extraction columns, gas scrubbers, etc. can be achieved by selecting suitable parameters.

Preferably, the structure is constructed and the flow breakers are arranged in such a manner that the first fluid can flow in a first direction, which crosses the flow breaker. In this manner it is achieved that the first fluid does particularly not flow in a direction parallel to the direction of the flow breaker or the direction of the ledges, respectively. Thus, a good contacting of the second fluid can be achieved with the first fluid, as in this way the first fluid is not conducted partially behind the flow breaker or the ledges, respectively.

In some variants, the structure may be such that the first fluid conducted parallel to the ledges is not conducted behind the ledges. This can be achieved by using suitable channels, capillaries and the like. In addition, in one embodiment a cross-current may be provided, whereby the first fluid is conducted relative to the ledges in a right angle, and the second fluid is conducted parallel to the ledges.

In case of counter current contacting, the ledges may be arranged horizontally, for instance. In case of cross current, the ledges can be arranged approximately vertically, as the second fluid, which hardly wets the structure or does not wet the structure at all, typically flows approximately horizontally in cross current. When choosing a suitable dimensioning of the ledges, the velocity between the phases at the contact surface can be significantly reduced, which largely avoids a dragging away of the fluid.

In addition, in a preferred embodiment the ledges can be dimensioned in such a manner that defined vortexes form between them. With that, the flow velocity of the second fluid can be reduced, or the flow direction can be turned to another direction. For ledges which are perpendicular to the flow direction of the second fluid, under some circumstances the flow direction can even be completely turned around by the vortex along the contact surface. In case of a countercurrent contactor, exactly where the two phases are in direct contact, locally a concurrent contactor can be formed. This is particularly advantageous, as there is typically no flooding in case of a concurrent contactor.

Preferably, the first direction forms an angle of 60° to 90° with the ledge direction, in particular an angle of 75° to 90°, preferably an angle of 80° to 90°. This allows a particularly optimized contacting of the two fluids.

Alternatively, the angle can also be in a different range, in particular below 60°.

In a preferred embodiment of the method, the structure is wetted by the first fluid, while in particular the second fluid does not wet the surface of the structure at all or only to a lesser extent.

In variants, the throughput of the two fluids can also be adjusted by concretely selecting the structure, for instance based on the pore size of the structure, depending on the viscosity of the fluid. Instead of assuming the wettability of the fluids, or in addition to the selection of the ledges, a ledge, a collar and/or a structuring of the surface may be provided.

Conducting the fluids through the structure and the contact zone can furthermore be controlled by choosing the wettability of the ledges. In a particularly preferred embodiment, the ledge comprises a region proximal to the structure, which has a first wettability, as well as a region distal to the structure, which has a second wettability differing from the first wettability. With such construction of the ledge it can be prevented that the first fluid gets into an outer area of the ledge and is dragged away there by the second fluid. In this way the method can be carried out with the first and second fluids as well, which have a similar or the same wettability or polarity, respectively.

In one embodiment the structure may be made of a hydrophilic material, in particular hydrophilic ceramics, such as aluminum oxide, zirconium oxide and/or titanium oxide, and can thus be very well wettable for polar substances. In an inner segment, i.e. in the direction of the structure, the ledges may also be made of a hydrophilic material, in particular a hydrophilic ceramic, e.g. aluminum oxide, zirconium oxide and/or titan oxide, and on the outside, they can be made of a more hydrophobic material, in particular a ceramic material containing rare earths. Particularly suitable as more hydrophobic material is, for instance, cerium dioxide. The skilled person knows further suitable materials or coatings. A hydrophilic ceramic is particularly understood as ceramic material, which—in relation to water—has a contact angle of <10°. Contact angles of >85° are regarded as hydrophobic.

In this respect as well, instead of or in addition to the selection of the wettability of the regions of the ledges, a ledge, a collar and/or a surface structuring may be provided.

Preferably, the structure comprises one or several of the following features:
 a) a tissue;
 b) open-pored material, in particular a foam;
 c) capillaries;
 d) stepped structure.

Particularly preferred is a structure with capillaries. In this respect, the structure may comprise a stepped structure, an open-pored material or a foam, etc. Particularly the stepped structure proved as particularly advantageous in practice.

However, in some variants the structure may also comprise other or additional features.

A mean diameter of capillaries, of free spaces in the staged structure and/or of the pores is preferably in a range of 50 micro meters to 5 millimeters, in particular of 100 micrometers to 2 millimeters, especially 200 micrometers to 1 millimeter. The diameter is thereby measured specifically perpendicular to a longitudinal direction of the respective structure.

The ledges are easily wettable by the first fluid, preferably on the side of the capillaries of the structure, and preferably they are wetted in operation. This helps balancing out the pressure difference by capillary forces. On the opposing side, which does not touch the capillaries, the ledges are advantageously arranged in a manner that they cannot be wetted by the first fluid or that wetting is very difficult. This can be achieved, for instance, by providing a suitable surface structure on the surface of the ledges in this area, in that the surfaces of the ledges can be suitably coated in this area, or in that the ledges in this area are made of a material that is difficult to be wetted by the first fluid. Due to the typically small dimensions of the structures described herein and the also typically complex three-dimensional structure, this material selection turned out to be particularly advantageous for the ledges.

If the first fluid does not flow parallel to the ledges, it must be possible that it flows underneath the ledges. This can be achieved in different ways. Capillaries could be formed, for instance, which are directed underneath the ledges. The capillaries can advantageously be dimensioned in a way that the pressure differences between the area before a ledge and the area behind a ledge can be balanced out by the capillary forces. However, at the same time the capillaries should not be dimensioned too small, as the fluid velocity may become too slow in very small capillaries because of the friction. The capillaries therefore preferably have to be adjusted to the two fluids as well as the further process parameters of the device, such as the temperature, flow velocity, volume flow, etc.

The capillary structure conducting the liquid may be provided as a row of levels arranged in parallel to each other that are connected to one another through bars. However, it may also be provided monolithically as honeycomb body with different comb shapes (triangle, rectangle, square, hexagon). The ledges can either be aligned precisely vertically to the flow direction of the second fluid. Specifically, in the version with a body consisting of several planes arranged parallel to one another, the ledges could also be arranged at a small angle relative to the vertical to the flow direction of the second fluid. With that, a circulation move is induced in the flow of the second fluid, which effects an additional blending of the second fluid.

The capillaries, in which the first fluid flows, may advantageously be realized by crossing step bars as described in the application EP2897783. In this way it can be ensured that the liquid is intensively blended in the capillaries of the structure during the material exchange and thus the material exchange is intensified.

However, the capillaries can also be arranged at random, and, for instance, be made of open-pored foam structures that are commercially available made of plastic materials, metals or ceramics. Other setups of the capillary structures, for instance by means of tissues or other porous materials, could also be imagined.

Preferably, the structure is built in honeycomb shape, whereby the flow breakers protrude inwardly in the honeycombs. In a particularly preferred embodiment, several devices comprise a joint boundary surface in combination, which form a polygonal channel for conducting the second fluid. The honeycomb structure is simply designed and can thus be manufactured cost-effectively.

In some variants, any other shape of the structure can be provided (see below).

Preferably, the honeycombs have a cross-section that is shaped as a regular polygon, in particular a triangle, a rectangle or a hexagon. These designs have the advantage that individual devices can be built up particularly easily to form arrangements with several monoliths.

In some variants, other cross-sections may be provided as well.

It is particularly preferred that the structure comprises step bar elements. The use of step bar elements is particularly preferred in a layer-by-layer construction of the structure, as in this manner a layer for a tread can be formed. In addition, the stepped structure has the advantage that the first fluid is mixed in itself when overflowing.

In variants, the structure may also comprise smooth ramps instead of the step bar elements.

The structure preferably comprises several step bar elements that are arranged cross-wise. In this manner it is achieved that the first fluid has to pass through a large number of directional changes in the structure, which, in turn, would improve the blending.

Here, again, cross-wisely arranged smooth ramps may be provided in a variant.

In particular in the embodiment with capillaries, in which the first fluid is flowing, can advantageously be realized by crossing step bars, as described in the patent application EP 2 897 783 A1. With that, it can be ensured that the liquid is intensively blended in the capillaries of the structure during the material exchange and thus the material exchange is intensified.

In variants, however, the capillaries could also be arranged at random, and may be made of open-pored foam structures, for instance, consisting of plastic material, metals or ceramics. Other assemblies of the capillary structure could also be imagined, for instance by means of tissue or other porous materials.

An arrangement preferably comprises a device comprising a structure and a flow breaker, whereby at a first end of the device a distributor for distributing the first fluid is arranged in the structure, and a collector for collecting the first fluid from the structure is arranged at the other end located opposite said first end. With that, the structure in the fluid connection is practically interposed between the distributor and the collector, so that the structure can be supplied particularly easily. The distributor and the collector may comprise one or several supply or discharge lines each for the first fluid. However, it is particularly preferred that the distributor and the collector have exactly one supply or discharge line each.

In variants, a distributor and/or collector may also be foregone. In this case, the structure could be impinged at the first end directly with the first fluid, for instance. Several devices could also be connected with each other in such a way that the first fluid is conducted through structures of the several devices (see below), and wherein a device of a first end comprises a distributor, and a device of the second end comprises a collector. Depending on the design of these devices, the collector and the distributor do not necessarily have to be opposite one another regarding the flow direction of the first fluid. Finally, the distributor and the collector could as well be integral parts of the device and connected with the device in one piece.

For reliably introducing and evenly distributing the first fluid and leading out the fluid from the structure at the lower end, in particular in case of high-performance counter-current contactors, a distributor for distributing the first fluid, in particular distributing a liquid, in the structure is provided at the upper end of the structure that is preferably adjusted to said structure. At the opposite end of the structure there is preferably at least one corresponding liquid collector.

Said distributor, in particular a liquid distributor, for instance, and the collector, in particular the liquid collector, for instance, could be generated with the same production method mentioned above for a layer-by-layer assembly of structures, with which the device can be produced as well. In addition, the distributor and the collector can also be produced fixed with the structure of the contactor, in particular built or produced integrally.

Once the fluid or the liquid is evenly distributed in the structure, there is typically no or only little risk that a fluid or liquid maldistribution (uneven volume flows across the flow area) could occur. Contrary to classic counter-current contactors, such as structured packages or tower-packing columns, a periodic new distribution of the fluid or the liquid, respectively is hardly or not necessary. This also helps reducing the construction volume significantly with respect to the contactors of prior art.

Preferably, two devices are arranged in such a manner that the first end of the first device is connected to a second end of the second device in such a manner that the first fluid can be conducted from the structure of the first device to the structure of the second device. Several such arrangements can be connected in parallel and/or in series, which increases the performance of the contactor. In this manner, several such devices can be put together like modules to form contactors of any size.

In some variants, these devices could, for instance, be arranged only in parallel.

A method for producing a device described above comprises an assembly by means of an additive process. With that, the devices can be assembled particularly easily. The assembly is preferably taking place directly through data models by means of a chemical or physical process. The skilled person is familiar with a plurality of methods.

The assembly of the device is preferably in layers, which are continuously applied on top of each other. In this manner the device can be produced cost-efficiently in big quantities. Furthermore, this helps to achieve different geometries of the structure and the ledges very easily. Such methods are also known as 3D printing methods and can principally be implemented with almost every material.

With the layer-by-layer assembly of bodies such as the device described above, it is also possible to realize very small devices. The ledge heights could be in a range of 50 to some 100 micrometers, for instance. The dimensions of the capillaries are typically predetermined by the desired liquid throughput and the viscosity of the liquid. They can vary in the range of some 100 micrometers up to several millimeters. For processing liquids with low viscosity, structured counter-current contactors can be realized with specific contact surfaces of more than 1000 $m^2/m^3$.

In variants, the layer-by-layer assembly can also be renounced. Single elements of the device could be produced instead and connected with each other in another procedural step. The skilled person knows further variants in this context.

Following the application of one layer, there is preferably a bonding process. In this step, the layer could be cured, for instance. In such a bonding process a cured layer can build a compound with an already existing layer that under some circumstances may be already hardened.

Depending on the selected material the bonding process could also be skipped. In addition, a bonding process could also be provided each time after applying more than one layer.

A layer is preferably applied by means of a stencil. The stencil may be designed in such a manner that it can be positioned as even plane over a printing plate. Recesses in the stencil typically define the shape of the layer. A stencil or a shaping tool may define a plurality of identical or different shapes for layers. Stencils can particularly also be used for the same layers, which only differ in their position within the plane (turned, rotated, mirrored). With this process layers can be built up quickly and automatically. The process is thus particularly suitable for the mass production of devices. In a special embodiment the shaping tool is a screen, in particular a screen for technical screen printing.

In some variants a stencil can be renounced as well. The intermediate spaces could be filled with a removable fill material. In case the layer material has sufficient inherent stability, the filling of the intermediate spaces could be renounced as well.

The stencil is preferably used to form a plastically deformable mass to provide a layer. Particularly suitable are suspensions. These can comprise fine-grained power as main substance. Suitable to this end are, among other things, metals, metal alloys as well as ceramics and glass ceramics. For forming a plastically deformable mass, in particular organic binders can be added, for example CMC (carboxy methyl cellulose), polyolefin, starch (cornmeal, wheat flour, etc.). Alternatively, different types of photopolymers can be used as organic binders. There is a large number of different photopolymers. Preferably, acryl monomers, among others hexane-1.6-diol-diacrylat, trimethyl propane triacrylate, poly (ethylene glycol) diacrylate that were blended with small amounts of photoinitiators, such as 0.5% 2.2-dimethoxy-2-phenyl acetophenone, can be considered as possible binders. Depending on the respective requirements, these monomers can be blended with different oligomers of polyacrylates.

If the plastically deformable mass is intended for sintering, which is the case, for instance, with respect to ceramics, metals or glass, it preferably contains a particularly high share of the powder to be sintered, in particular >35 percent by volume, more precisely in particular >50 percent by volume.

In a special embodiment, the plastically deformable masses comprise additional additives that can be used for changing the rheologic properties of the mass, for instance dispersing aids. Such additives are known to the skilled person and can be selected individually to fit the required preconditions (Journal of Engineering, Volume 2013 (2013), Article ID 930832).

In another embodiment, the plastically deformable mass comprises pure plastic parts. These can comprise the corresponding monomers and/or oligomers that are polymerized later. Such plastically deformable masses can also comprise additional additives for setting the rheologic properties as well as solvents, pigments, catalysts or biocides.

In a special embodiment, the plastically deformable mass may contain powder of a base material as a suspension from a group consisting of: metals, metal alloys, ceramics, metal-ceramic composites, glass, plastic materials and/or plastic composites with reinforced fibers or metal or ceramic particles. Blends of these materials are imaginable as well.

Preferably, a flow breaker is applied to a structure. It is particularly preferred that the flow breaker comprises several applied layers. The flow breaker may thereby be applied either separately or integrally with the structure. In preferred proceedings the flow breaker may be applied with different materials which differ with respect to the wettability. In this way, a first region of the strut having a first wettability and facing the structure may receive a first material in one or several layers, whereas one or more of the following layers applied may consist of a second material, which has a second wettability that differs from the first one.

Alternatively, the structure alone may be built up layer by layer, while the flow breakers are subsequently connected to the structure.

The device is preferably solidified by a bonding process, in particular by heating or sintering. If a sinter material from the group specified above is used as plastically deformable mass, such as metals, metal alloys, ceramics, glass or composites of these materials, the process according to the invention particularly preferably comprises a thermal treatment of the applied layers for sintering, which is carried out after the completion of the shaping process of the layers applied.

In a preferred embodiment, the contactor is sintered at temperatures ranging from 500 to 2,500° C., preferably at 600 to 1,700° C.

In some variants, the solidification process can be skipped, provided that the used material allows that. In addition, the solidification process can also take place by means of triggering a polymerization or the like. The skilled person is familiar with further techniques in this respect.

The process for producing the device is preferably a process in accordance with the international patent application no. PCT/CH2014/000177.

The device is preferably provided in a manner that it can be cleaned. It is particularly preferred to produce the device from a ceramic so that the device can be cleaned by heating, in particular by burnout.

Alternatively, the device may also be intended for the single use, in particular if the device is exposed to chemicals in operation, or if residues occur that cannot be removed.

Based on the combination of much higher fluid velocities and throughputs of both fluid flows as well as the very large specific surface between the phases, a device or arrangement is achieved, in which the material exchange process can be carried out with much smaller volumes. Especially in case of chemical plants that are installed on floating platforms, for instance FLNG platforms (Floating Liquefied Natural Gas), the structural volume is highly significant and expensive, so that the device or arrangement described herein is particularly preferred in FLNG platforms. However, with the process described in this application cost-efficient plants can be realized in general. The presented structured counter- and cross-current fluid contactor (the device or arrangement, respectively) can be smaller than the apparatus of prior art by several factors regarding the required processing volume.

Further advantageous embodiments and feature combinations of the invention are apparent from the following detailed description and the entirety of the patent claims.

SHORT DESCRIPTION OF THE DRAWINGS

Figure 2:
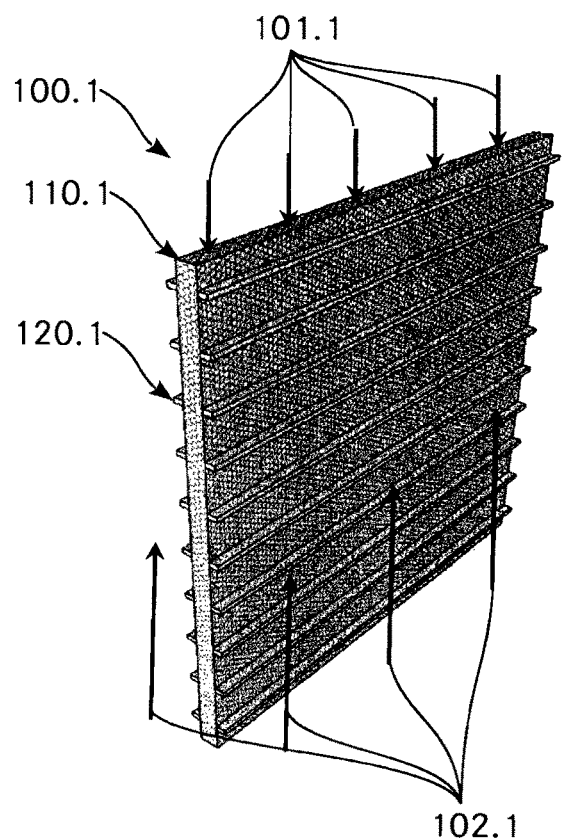
Figure 3A:
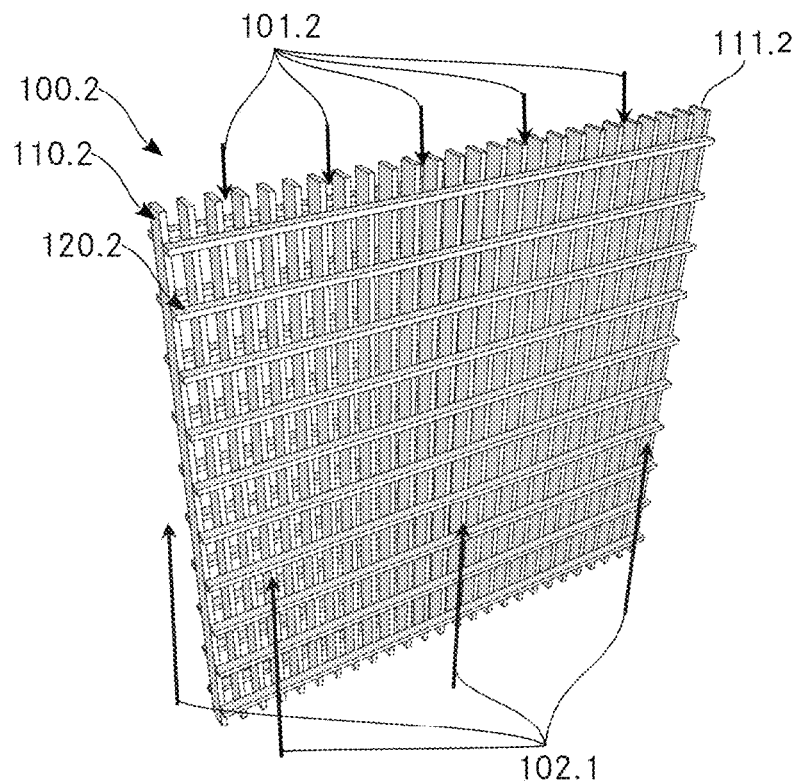
Figure 3B:
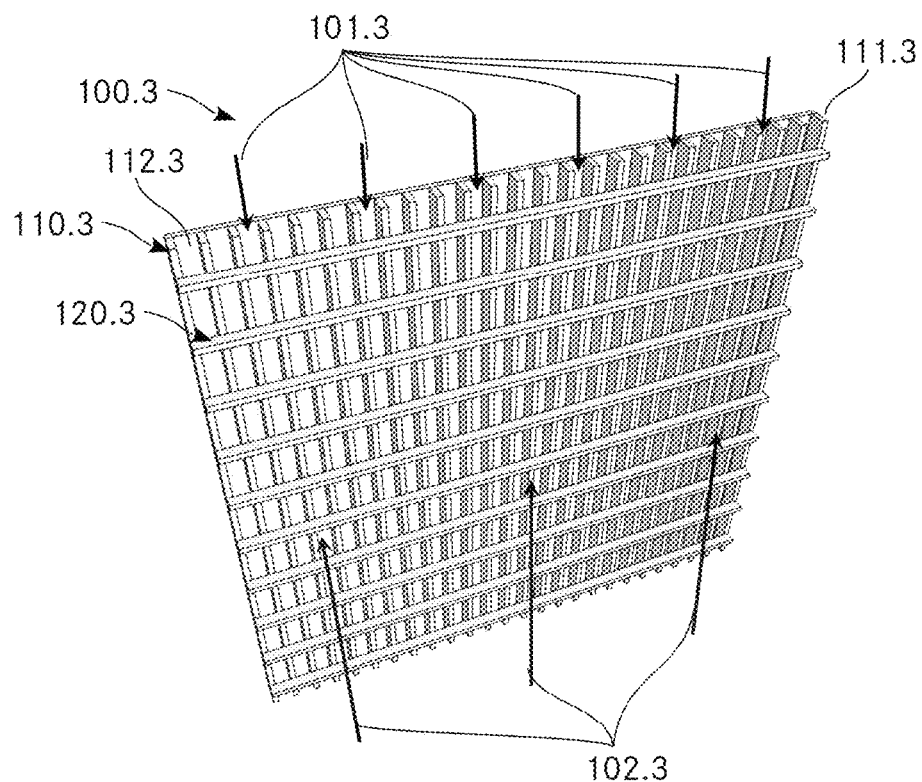
Figure 4:
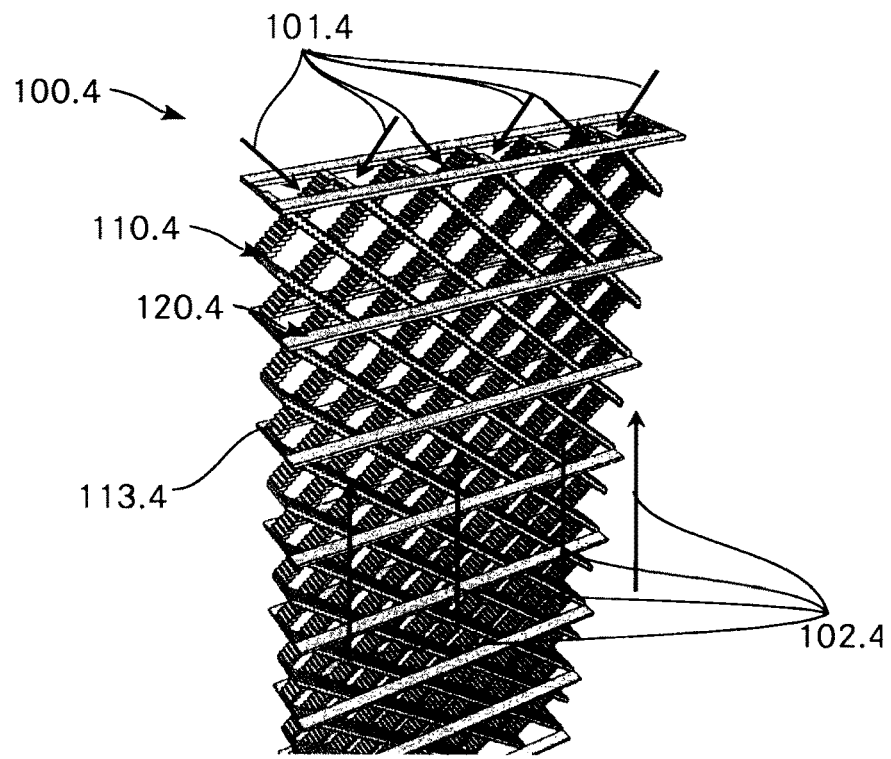
Figure 5A:
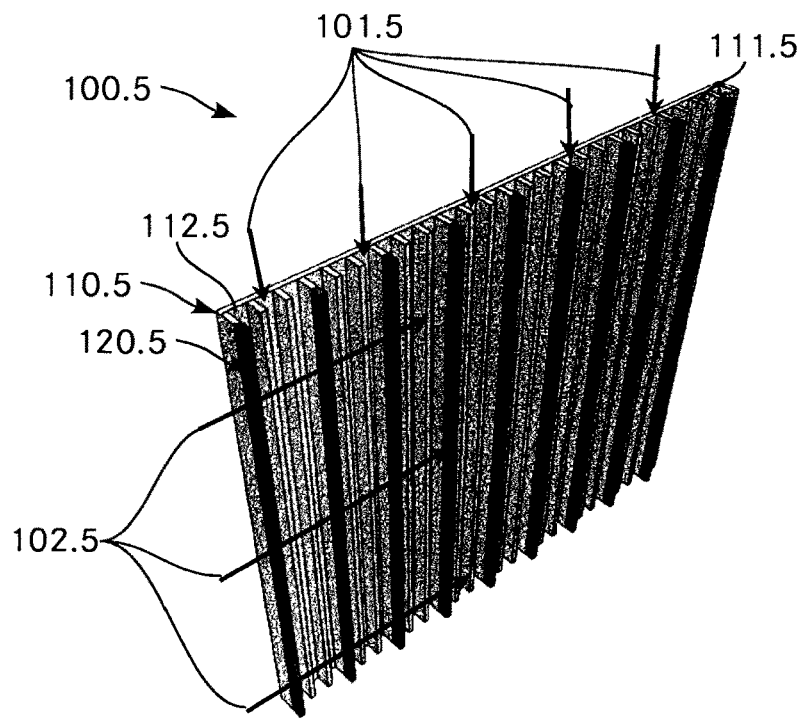
Figure 5B:
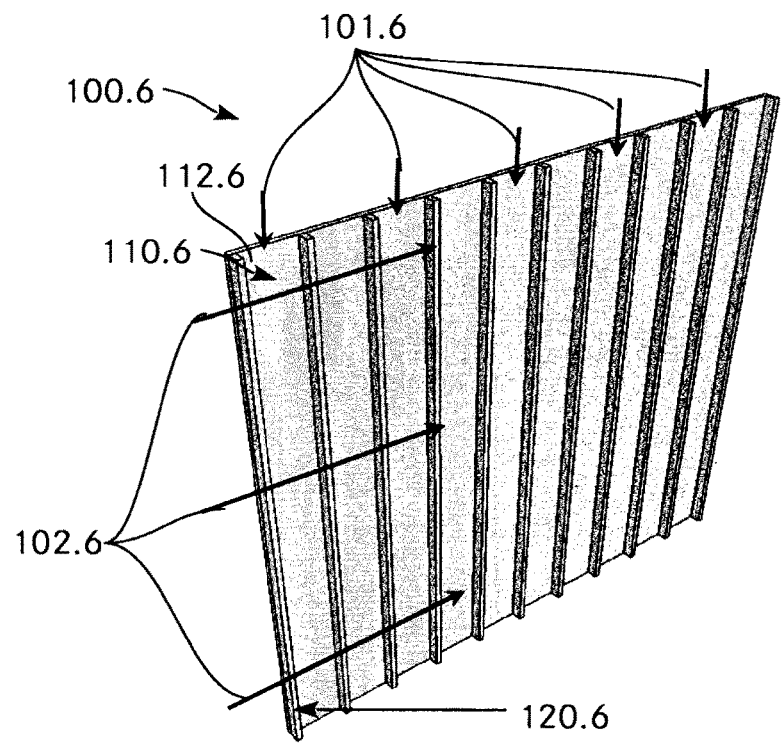
Figure 6:
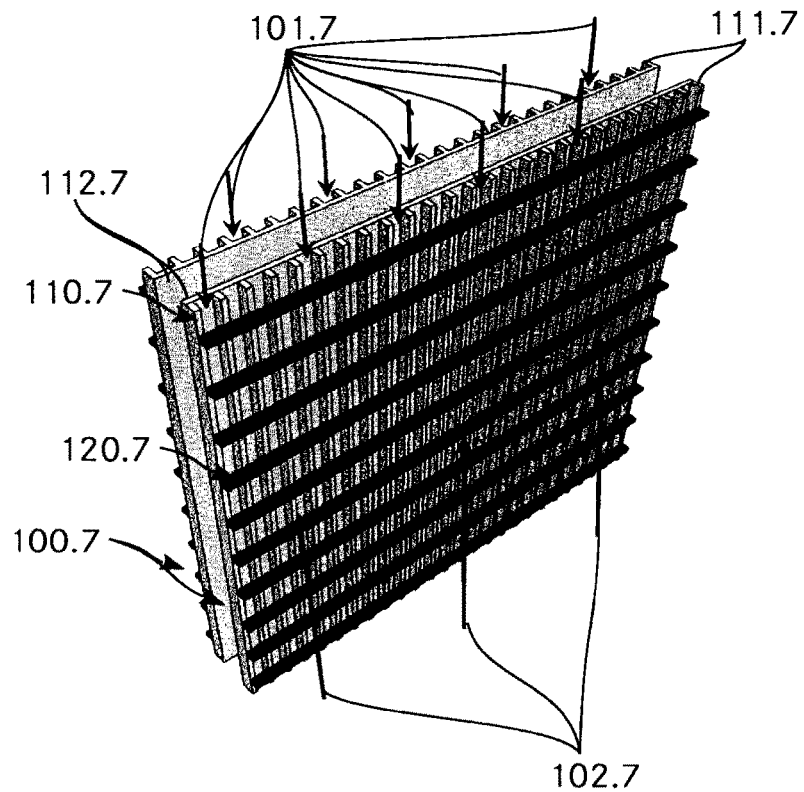
Figure 7:
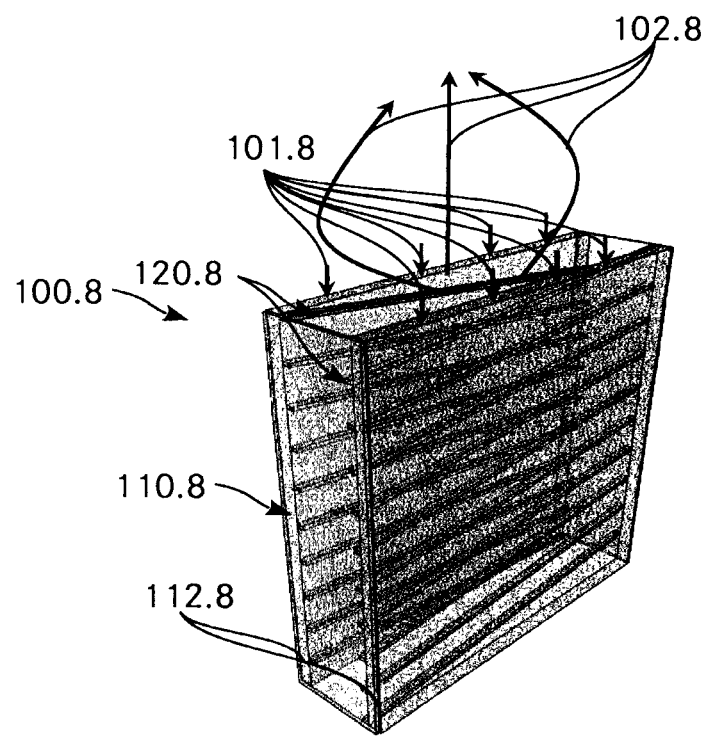
Figure 8:
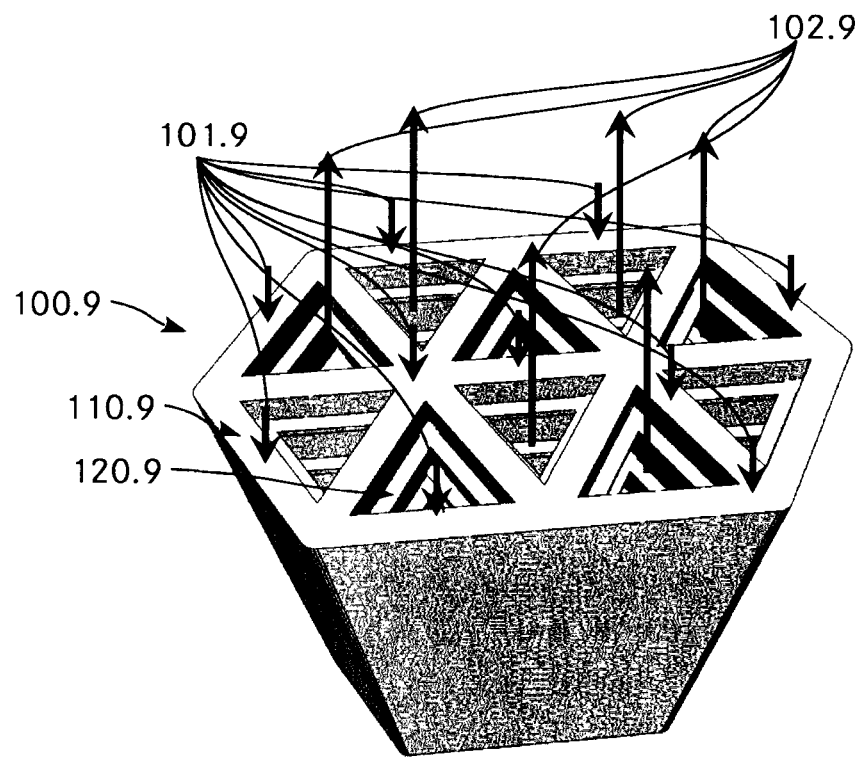
Figure 9:
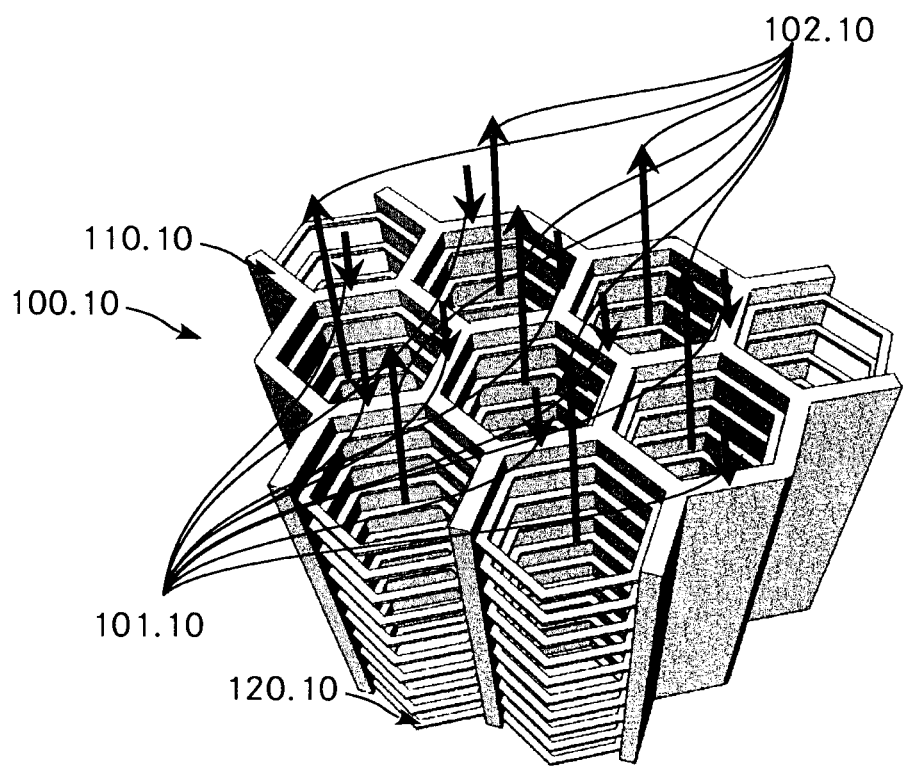
Figure 10:
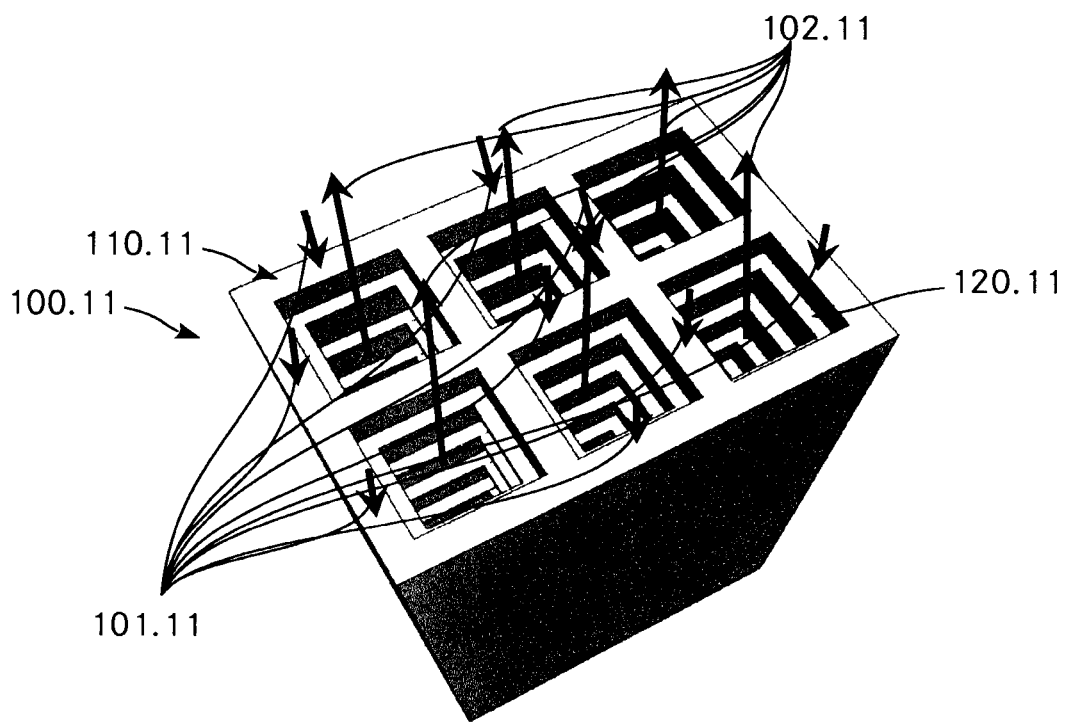
Figure 12:
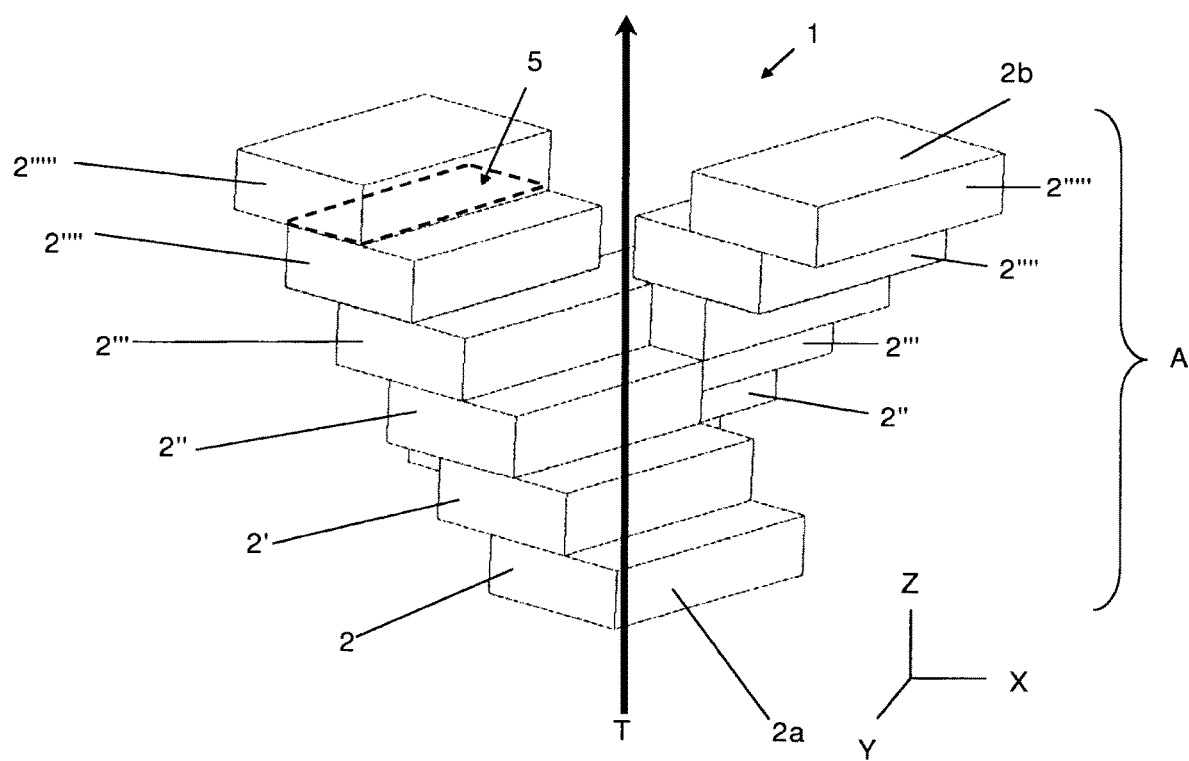

The drawings used for illustrating the embodiment examples show the following:

FIG. 1 a schematic illustration of a functioning of a contactor;

FIG. 2 a schematic illustration of a first embodiment, formed as counter-current contactor;

FIG. 3a a schematic illustration of a second embodiment, formed as counter-current contactor;

FIG. 3b a schematic illustration of a third embodiment, formed as counter-current contactor;

FIG. 4 a schematic illustration of a fourth embodiment, with a stepped structure;

FIG. 5a a schematic illustration of a fifth embodiment, formed as cross-current contactor;

FIG. 5b a schematic illustration of a sixth embodiment, formed as cross-current contactor;

FIG. 6 a schematic illustration of a seventh embodiment, formed as heat exchanger;

FIG. 7 a schematic illustration of an eighth embodiment, formed as counter-current contactor with angled ledges;

FIG. 8 a schematic illustration of a first embodiment of a monolith, with channels having a triangular cross-section;

FIG. 9 a schematic illustration of a second embodiment of a monolith, with channels having a hexagonal cross-section;

FIG. 10 a schematic illustration of a third embodiment of a monolith, with channels having a rectangular cross-section;

FIG. 11a a schematic illustration of a contactor built of several monolith structures, comprising a liquid distributor and a liquid collector;

FIG. 11b a cutout of the contactor of FIG. 11a with a focus on the liquid distributor FIG. 11c a cutout of the contactor of FIG. 11a with a focus on the liquid collector;

FIG. 12 schematic view of the layer-by-layer assembly of a contactor; and

Figure 13:
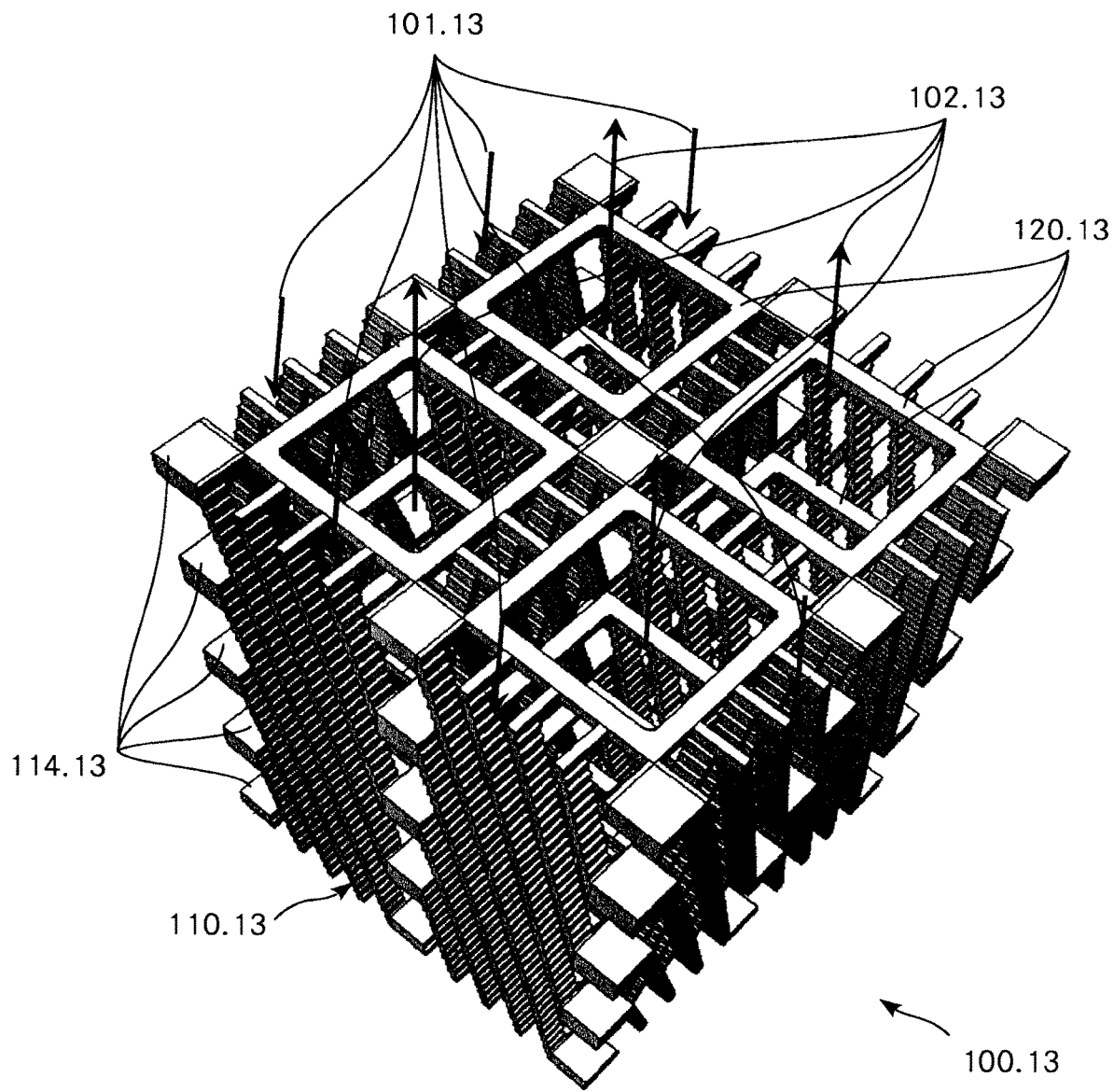

FIG. 13 a schematic illustration of a particularly preferred embodiment of a monolith according to FIG. 10 with a stepped structure for conducting the first fluid.

Principally, in the drawings the same parts are designated with the same reference numbers.

WAYS OF IMPLEMENTING THE INVENTION

FIG. 1 shows a schematic illustration of a functioning of a contactor. The contactor essentially consists of a structure 110.0 for conducting a first fluid and flow breakers in the form of several ledges 120.0 arranged in parallel. The ledges 120.0 are connected to the structure 110.0. In the region of an outer surface of the structure 110.0, the contact zone 104.0 is provided, which is arranged to conduct a second fluid and to bring into contact the first and the second fluids. The structure 110.0 can be formed in different ways, as will be exemplified hereunder with different examples. The structure 110.0 may particularly consist of walls, capillaries, pores, tissue, that are preferably easily wettable by the first fluid.

The ledges 120.0 comprise a region facing the structure, which can easily be wetted by the first fluid. The ledges 120.0 furthermore comprise a region facing away from the structure, which is hardly wettable by the first fluid. In this manner the first fluid should be kept away from the region, in which the second fluid flows in the opposite direction with high velocity, as the first fluid could be dragged away here by the second fluid. Instead of the different wettability levels, other properties of the ledges, in particular their shapes, tearing edges and the like are provided.

In operation, a first fluid, in particular a liquid, is conducted through the structure in a first direction 101.0. The second fluid, in particular also a liquid or a gas, a vapor, etc., is conducted along the phase boundary surface 104.1 formed in the contact zone 104.0 over the several ledges 120.0 in a second direction 102.0. The phase boundaries or boundary surface 104.1 formed between the two fluids in this manner is indicated in FIG. 1 by a broken line and shows a bent form, as illustrated. In the visualization according to FIG. 1, the directions 101.0 and 102.0 are opposed to each other, which corresponds to a counter-current. In the following examples other possible flow directions of the two fluids relative to each other are shown. In the region between the ledges 120.0, the second fluid is brought into contact with the first fluid. The two fluids can exchange energy or material in this region. In the instant case, the distance between the neighboring ledges and the heights of the ledges have a relation of approximately 5:2. Consequently, between the ledges 120.0, the second fluid shows a significantly reduced flow velocity. Due to the vortexes, the second fluid also shows a significantly changed flow direction between the ledges 120.0 as compared to the flow direction outside of the ledges 120.0. In this manner, in turn, ideally a concurrent contacting of the first and the second fluid is generated at the free surface, due to which flooding can eventually be substantially prevented.

FIG. 2 shows a schematic illustration of a first embodiment of a contactor 100.1, formed as counter-current contactor. The contactor 100.1 substantially consists of a structure 110.1 and flow breakers in the form of several ledges 120.1 arranged in parallel. The structure 110.1 is substantially plate-shaped and consists of a tissue or an open-pored foam, through which the first fluid can flow in the direction 101.1. The ledges 120.2 are connected to the structure 110.1 at regular intervals. The ratio between the ledge distances and the ledge heights is approximately 5:1 in this case. The structure 110.1 has ledges 120.1 on both sides, whereby pairs of ledges are opposed to each other, relative to the structure 110.1. The second fluid flows in the direction 102.1, substantially in the opposite direction of the first fluid. The second fluid is conducted over the bars on both sides of the structure 100.2, so that a contacting between the two fluids can be achieved on both sides.

FIG. 3a shows a schematic illustration of a second embodiment of a contactor 100.2, formed as counter-current contactor. The contactor 100.2 substantially consists of a structure 110.2 and flow breakers in the form of several ledges 120.2 arranged in parallel. The structure 110.2, in turn, is arranged substantially plate-shaped and comprises a series of bars 111.2 arranged in parallel, between which open capillaries are provided on both sides. The ledges 120.2 are connected to the structure 110.2. The ledges 120.2 are arranged perpendicular to the bars 111.2. The structure 100.2, in turn, has ledges 120.2 on both sides, which are opposite each other in pairs relative to the structure 100.2. A ratio of the ledge distances and the ledge heights is approximately 6:1 in this example. The first fluid flows in the direction 101.2 between the bars 111.2 through the structure 110.2, while the second fluid is conducted rectangularly to the ledges 120.2 and thus in parallel to the bars 111.2. The second fluid is conducted on both sides of the structure 100.2 over the bars, so that a contacting of the two fluids can be achieved on both sides.

FIG. 3b shows a schematic illustration of a third embodiment of a contactor 100.3, formed as counter-current contactor. The contactor 100.3 substantially consists of a structure 110.3 and flow breakers in the form of several ledges 120.3 arranged in parallel. Other than the contactor 100.2, the structure 110.3 only shows one-sided open capillaries in the present case, which are formed by the bars 111.3. While a first side of the structure 100.3 is connected analogously to the structure 100.2 through ledges 120.3, the opposing second side of the structure 100.3 connected to a plate 112.3. A ratio of the ledge distances and the ledge heights is approximately 5:1 in this example. The second fluid is thus exclusively conducted in the direction 102.3 over the first side.

FIG. 4 shows a schematic illustration of a fourth embodiment of a contactor 100.4, with a stepped structure. The contactor 100.4 substantially consists of a structure 110.4 and flow breakers in the form of several ledges 120.4 arranged in parallel. The structure 110.4 comprises a plurality of longitudinal stepped elements 113.4. This are assembled in two layers. In a first layer, the elements 113.4 are arranged in parallel at regular intervals in such a manner that the steps of the elements 113.4 are facing each other. The second layer is built up identically. The two layers are now arranged in a manner that the step sides contact each other and the elements 113.4 of the first layer are oriented towards the elements 113.4 of the second layer approximately rectangularly. A distance between two neighboring elements 113.4 of one layer is approximately one third of the distance between two neighboring ledges 120.4. The ledges 120.4, in turn, are arranged at both sides of the structure 110.4, whereby two ledges 120.4 are opposed to each other relative to the structure 110.4. The elements 113.4 form an angle with the ledges 120.4 of approximately 45°. A ratio of the ledge distances and the ledge heights is approximately 7:1 in this example. The first fluid is conducted in the two planes of the structure in plane 101.4. The first fluid is conducted in the one plane at an angle 45° relative to the ledges, and in the other plane at an angle of approximately −45° or 315°, respectively. On average, the first fluid still flows in the opposite direction relative to the second fluid. The contactor 100.4 is thus a counter-current contactor.

FIG. 5a is a schematic illustration of a fifth embodiment of a contactor 100.5, again formed as cross-current contactor. The contactor 100.5 substantially consists of a structure 110.5 and flow breakers in the form of several ledges 120.5 arranged in parallel. The structure 110.5 is built up identically as structure 110.3, whereby several parallel bars 111.5 are arranged on a rear wall 112.5. In the present case, every third bar 111.5 is provided with a ledge 120.5. However, the skilled person knows that every second, every fourth, every fifth, etc. bar 111.5 could be provided with a ledge 120.5. A ratio of the ledge distances and ledge heights is approximately 7:1 in this example. While the first fluid is conducted between the bars 111.5 in the direction 101.5, the second fluid is conducted in the direction 102.5, both at a right angle relevant to the ledges 120.5 as well as to the direction 101.5.

FIG. 5b shows a schematic illustration of a sixth embodiment of a contactor 100.6, formed as cross-current contactor. The contactor 100.6 substantially consists of a structure 110.6 and flow breakers in the form of several ledges 120.6 arranged in parallel. In the present case, the structure 110.6 only comprises the plate 112.6, for instance in accordance with the contactor 100.5. The plate 112.6 can be provided as tissue or even plate. The ledges 120.6 are arranged on the plate 112.6 parallel to one another. The ratio of the ledge distances and the ledges heights is approximately 6:1 in this example.

FIG. 6 is a schematic illustration of a seventh embodiment, formed as heat exchanger, comprising two contactors 100.3 according to FIG. 3b. Essentially, this is another application possibility for a contactor according to FIG. 3b. The two contactors are arranged in a manner that the two plates 112.7 define an intermediate space through which a heat transfer medium can flow.

FIG. 7 is a schematic illustration of an eighth embodiment of a contactor 100.8, formed as counter-current contactor with angled ledges. The contactor 100.8 substantially consists of a structure 110.8 and flow breakers in the form of several ledges 120.8 arranged in parallel. The structure 110.8 comprises a plate 112.8 with ledges arranged on it in parallel, which are inclined relative to a flow direction 101.8 of the first fluid at an angle of approximately 5 to 10°. The structure 100.8 comprises a second plate 112.8 with identically arranged ledges 120.8. The two plates 112.8 are opposed to the facing ledges 120.8 such that one direction of the ledges 120.8 of the one plate 112.8 crosses one direction of the ledges 120.8 of the second plate 112.8. The ledges 120.8 of the first and the second plates 112.8 are spaced apart and thus form a flow space for the second fluid. The second fluid flows in the direction 102.8 and thus in the opposite direction 101.8 of the first fluid. With the orientation of the ledges 120.8, a rotational movement above an axis in the direction 102.8 is induced in the flow of the second fluid, which is suitable to intensify a blending in the second fluid.

The contactors described above can be assembled modularly in a manner that a larger monolith structure is achieved. There are three examples for a monolith, assembled from a plurality of contactors according to the above description.

FIG. 8 shows a schematic illustration of a first embodiment of a monolith 100.9, with channels having a triangular cross-section. The monolith 100.9 substantially consists of a structure 110.9 and flow breakers in the form of several ledges 120.9 arranged in parallel. The structure is made of an open-pored material in this example, which comprises a plurality of parallel channels in a flow direction 101.9 of the first fluid, through which the second fluid is conducted counter-currently to the first fluid. In the present example the channels have a triangular cross-section. Within the channels, ledges 120.9 protruding inwardly and circumferential ledges are arranged at regular intervals in a right angle relative to the flow direction 101.9.

FIG. 9 shows a schematic illustration of a second embodiment of a monolith 100.10, with channels having a hexagonal cross-section. The monolith 100.10 is substantially assembled identically as the monolith 100.9, whereby the channels have a hexagonal cross-section and are thus formed in a honeycomb shape. Within the channels, ledges 120.10 protruding inwardly and circumferential ledges are arranged at regular intervals in a right angle relative to the flow direction 101.10.

FIG. 10 shows a schematic illustration of a third embodiment of a monolith 100.11, with channels having a rectangular cross-section. The monolith 100.11 is substantially assembled in the same way as the monolith 100.9, whereby the channels have a rectangular cross-section. Within the channels, ledges 120.11 protruding inwardly and circumferential ledges are arranged at regular intervals in a right angle relative to the flow direction 101.11.

The skilled person is aware that the channels of the monoliths can also comprise differently shaped cross-sectional surfaces, for instance pentagonal, circular, rectangular, slit-shaped, etc.

FIG. 11*a* shows a schematic illustration of a monolith 100.12 according to one of the FIG. 8 to 10 or 13, comprising a liquid distributor 130.12 and a liquid collector 140.12. The liquid distributor 130.2 is connected with the end of the monolith 100.12 in such a manner that a first fluid flowing in the direction 101.12 in the inlet of the liquid distributor 130.12 reaches the structure of the monolith 100.12 and can pass through it. At the opposite end of the monolith, a liquid collector 140.12 that is assembled in the same way as the liquid distributor 130.12 is arranged in a manner that the first fluid is collected when exiting the structure of the monolith 100.12 and discharged through a drainpipe. Both the liquid distributor 130.12 as well as the liquid collector 140.12 comprise a plurality of openings, which are in communication with the above described channels of the monoliths 100.12, so that the second fluid can reach the channels through the liquid distributor 130.12 and can discharged from the channels again through the liquid collector 140.12.

FIG. 11*b* shows a cutout of the contactor 100.12 according to FIG. 11*a* with a focus on the liquid distributor 130.12.

FIG. 11*c* shows a cutout of a contactor 100.12 according to FIG. 11*a* with a focus on a liquid collector 140.12.

In a preferred embodiment, the structure may consist of aluminum oxide and is thus easily wettable, while the ledges are made of aluminum oxide on the inside, i.e. in the direction of the structure, and cerium dioxide on the outside, whereby the latter is poorly wettable. The skilled person also knows further suitable materials or coatings, respectively, with which a contactor can be produced.

FIG. 12 finally shows a schematic illustration of a layered design of the contactor 1. The contactor 1 has to step elements 2*a*, 2*b*. The first step element 2*a* extends from the right bottom to top left, whereas the second step element 2*b* extends from the bottom left to top right and is arranged in the level behind the first step element 2*a*. The general flow direction T is from the bottom to the top. The division bottom/top was selected randomly, only serves for explaining the figure and is not have any functional relationship with the contactor 1. The general flow direction T indicates that a fluid passing through the contactor 1, has a first contact with the contactor 1 at the lower end, i.e. the inlet end of the contactor 1 in the present example, and exits said contactor at the upper end of the contactor 1 at the outlet end 11. The step elements 2*a*, 2*b* are formed by a plurality of layers 2, 2', 2", 2''', 2'''', 2''''', which provide the step elements 2*a*, 2*b* with an in total stepped structure. In that, a first layer 2 is partially overlaid by a second layer 2', which, in turn, is partially overlaid by a third layer 2". The degree of overlapping, i.e. the share in the surface of a step of the first layer 2, which is cohesive with the surface share of the second layer 2', is constant throughout the contactor 1 in this example. The individual layers 2, 2', 2", 2''', 2'''', 2''''' form both the steps of the first step element 2*a* as well as that of the second step element 2*b*. In the present example the degree of overlapping is at approximately 50%, i.e. 50% of the surface of a layer extending perpendicularly to the main flow direction is in cohesive contact with a neighboring layer. In the present example, the thickness of the layer, i.e. the surfaces that are extending parallel to the main flow direction T, corresponds to the free surface not overlapped by the subsequent layer. The overlapped surface shares of a layer form a blend surface 5. The blend surface 5 is cohesively connected in the finished contactor 1.

Exemplified with the example of layer 2'''' of the step elements 2*a*, 2*b*, this means that both steps that are lying in the layer 2'''' or in the surface area of the expansion axes X, Y form a joint layer. Between the steps of step elements 2*a*, 2*b* in the layer 2'''' recesses 12 are provided. The step elements 2*a*, 2*b* shown exemplary are extending reciprocally towards each other and are crossing at an angle of 90°, calculated on an assumed middle axle through all edges of the steps of a step element 2*a*, 2*b*.

FIG. 13 shows a schematic illustration of another contractor or another monolith 100.13. The further monolith 100.13 is a particularly preferred embodiment of the monolith 100.11 illustrated generally in FIG. 10. The channels, in which the fluid is conducted, also have a rectangular cross-section. Within the channels, ledges 120.13 protruding inwardly and circumferential ledges are arranged at regular intervals in a right angle relative to the flow direction 101.113 of the first fluid or in the flow direction of the second fluid 102.13. With the monolith 100.13, the structure 110.13 for conducting the first fluid is formed as stepped structure, analogously to the embodiment shown in FIG. 4. The monolith structure 100.13 is thereby obtained in that a network of several stepped partial structural units arranged relative to one another at a right angle are connected with each other in the region of the circumferential ledges 120.13 through cuboid connecting elements 114.13 that are arranged in the flow directions 101.13 or 102.13, respectively, or that are arranged at regular intervals. The short edges of the connecting elements 114.13 coincide with the short edges of the circumferential ledges 120.13.

The embodiments described above, however, only have to be understood as illustrating examples which can be modified within the framework of the underlying invention.

The contactor 1 shown in FIG. 1 could also be produced as multiple, which produces a bigger contactor 1 with more step elements 2*a*, 2*b*. Such an element can be repeated as often as desired, for instance as an interval A, also with a different basic orientation, in order to produce a bigger contactor 1.

The layer thicknesses of the layers 2, 2', 2", 2''', 2'''', 2''''' shown exemplary in FIG. 1 may vary from 30 µm to 10 mm. In the present example, the layers 2, 2', 2", 2''', 2'''', 2''''' have layer thicknesses of 500 µm.

In FIG. 2, the tissue or the open-pored foam can also be provided as ordered capillary system, for instance in the form of step bars as shown in FIG. 4. The open-pored material with a random structure shown in FIGS. 8, 9 and 10 can also be replaced by an ordered structure with regularly arranged capillaries and/or step bars.

In summary, it is to be determined that according to the invention a device is provided, by means of which two fluids can be brought into contact with one another in a particularly efficient way, and with which a risk of flooding can be reduced.

The invention claimed is:

1. A distillation column, extraction column or gas scrubber comprising a contactor for contacting at least two fluid flows, comprising a structure with pores and/or capillaries having a mean diameter of 200 μm to 1 mm for conducting a first fluid, whereby the structure comprises a contact zone not comprising pores and/or capillaries having a mean diameter of 200 μm to 1 mm, which contact zone is designed to conduct a second fluid, and whereby in the contact zone the first fluid can be brought into contact with the second fluid, wherein in the contact zone at least one flow breaker (120.0) is provided for interrupting a flow of the second fluid, wherein the flow breaker (120.0) comprises at least two ledges (120.0) each having a proximal end disposed toward the structure and a distal end disposed toward the contact zone, wherein the distal end of each ledge is spaced away from the structure by a height dimension, and the two ledges are spaced away from each other by a spacing dimension, wherein a ratio of the spacing dimension to the height dimension is in a range of 1 to 10, wherein a distributor for distributing the first fluid in the structure is provided at a first end of the contactor and a collector for collecting the first fluid from the structure is provided at a second end of the contactor opposed to the first end, wherein the structure comprises several step bar elements arranged cross-wise.

2. The distillation column, extraction column or gas scrubber according to claim 1, wherein the second fluid can flow in a second direction, which crosses the flow breaker.

3. The distillation column, extraction column or gas scrubber according to claim 1, wherein the structure is designed in such a manner and the flow breaker (120.0) is arranged in such a manner that the first fluid can flow in a first direction, which crosses the flow breaker.

4. The distillation column, extraction column or gas scrubber according to claim 3, wherein the ledges extend in a direction away from the structure at an angle of 60° to 90°.

5. The distillation column, extraction column or gas scrubber according to claim 1, wherein the ledges (120.0) comprises a region (122.0) proximal to the structure, which has a first wettability, and wherein the ledges (120.0) has a region (121.0) distal to the structure, which has a second wettability that is different from the first wettability.

6. The distillation column, extraction column or gas scrubber according to claim 1, wherein the structure comprises one or several of the following features:
 a) a tissue;
 b) an open-pored material;
 c) capillaries;
 d) step structure.

7. The distillation column, extraction column or gas scrubber according to claim 1, wherein the structure is formed in a honeycomb shape, whereby the flow breaker (120.0) protrudes radially inwardly in the honeycomb.

8. The distillation column, extraction column or gas scrubber according to claim 7, wherein the honeycomb have a cross-section in the shape of a regular polygon.

9. The distillation column, extraction column or gas scrubber according to claim 1, wherein two contactors are arranged in such a manner that the first end of the first contactor is connected to a second end of a second contactor in such a manner that the first fluid can be conducted to the structure of the second contactor by the structure of the first contactor.

10. The distillation column, extraction column or gas scrubber according claim 1, wherein the ratio of the distance between two neighboring ledges (120.0) and the height of the ledges (120.0) is in a range of 3 to 7.

11. A process for producing a contact between a first fluid and a second fluid comprising the step of using a distillation column, extraction column or gas scrubber according to claim 1.

12. The process according to claim 11, wherein the second fluid is swirled by the flow breaker (120.0), with which a concurrent contacting of the first fluid and the second fluid is reached locally.

13. The process according to claim 11, wherein the flow velocity of the second fluid is selected in a way that flooding does not occur.

* * * * *